UNITED STATES PATENT OFFICE.

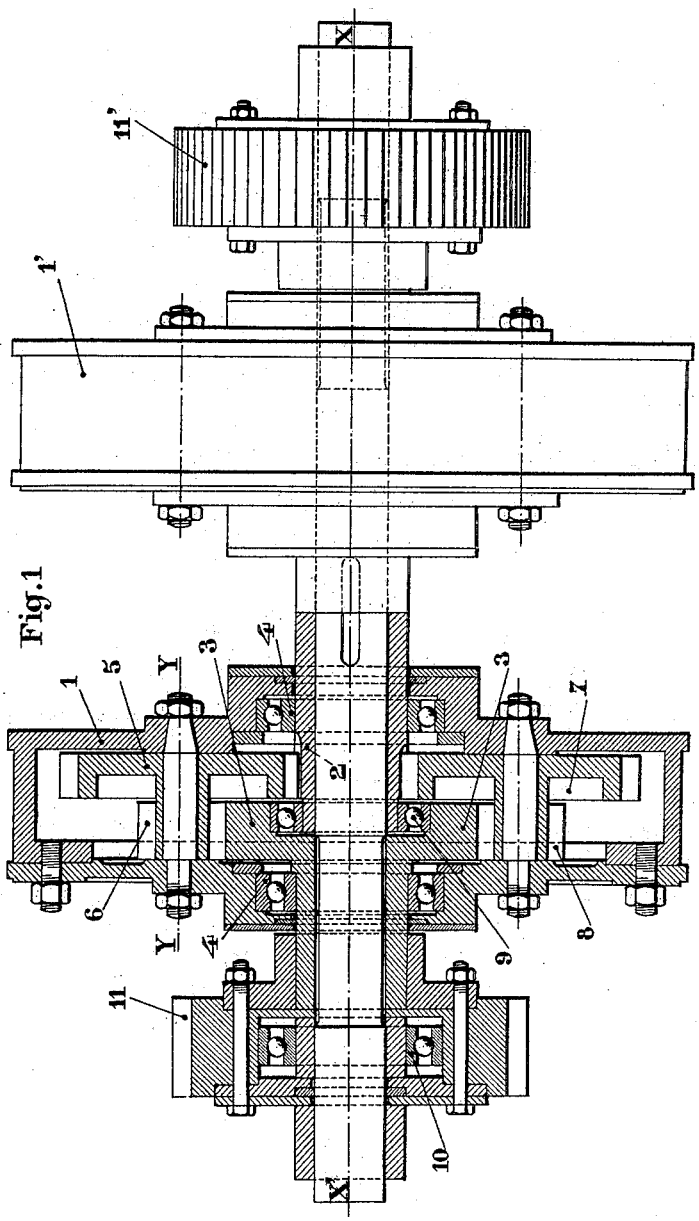

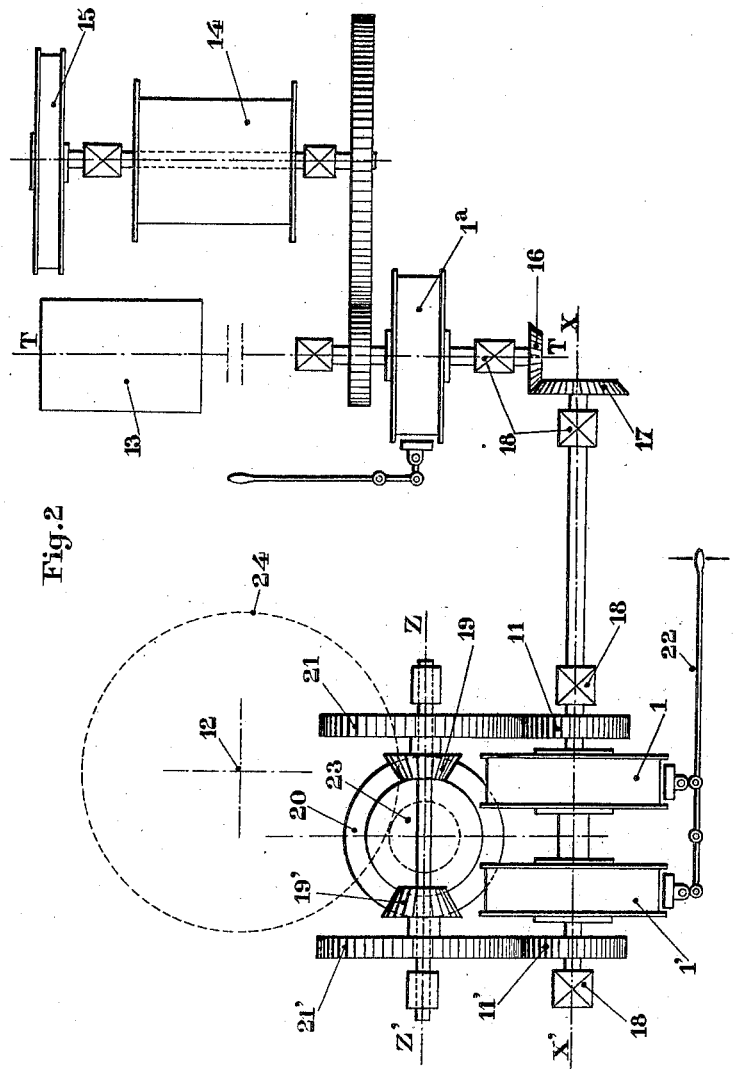

HUBERT FRANCOIS HENRI GEORGES MIOT, OF VANVES, FRANCE, ASSIGNOR TO PIERRE BARUCH BERNARD AND ANATOLE LOUIS MOUTIER, BOTH OF PARIS, FRANCE.

MECHANISM FOR REVERSING THE DIRECTION OF MOTION OF MACHINERY.

1,397,172.   Specification of Letters Patent.   Patented Nov. 15, 1921.

Application filed June 2, 1920. Serial No. 385,883.

*To all whom it may concern:*

Be it known that I, HUBERT FRANCOIS HENRI GEORGES MIOT, a citizen of the French Republic, and residing at 24 Rue d'Issy, Vanves, Seine, France, have invented certain new and useful Improvements in Mechanism for Reversing the Direction of Motion of Machinery, of which the following is a specification.

This invention relates to reversing mechanism for hoisting machinery in which dynamometric brakes are used.

The object of the present invention is to combine a dynamometric braking mechanism with a reversing mechanism, adapted more especially for use with hoisting machinery more particularly for operating the slewing and traveling motion of cranes.

The mechanisms mounted on the rotary platform of a crane constitute three distinct groups:—

(1) Mechanisms for the lifting motion;
(2) Mechanisms for the slewing motion; and
(3) Mechanisms for the traveling motion.

The first motion requires the transmission of the driving couple only in a single direction, namely, that of the lift; the descent being effected by gravity.

For the two other motions the driving couple must be transmitted in one direction or in the opposite direction; each of these mechanisms constitutes a kind of windlass wherein the resisting couple is of the same amount in the two opposite directions.

The application of the dynamometric brake in these circumstances implies the interposition of a reversing mechanism between the brake and the part upon which the resisting couple acts or to which it is transmitted.

The actuation of the reversing mechanism is effected by the combination of two dynamometric brakes arranged side by side on the same driving shaft. These two brakes constitute a group hereinafter referred to by the designation: conjugated double dynamometric brake.

The accompanying drawings illustrate by way of example a constructional form of the improved apparatus.

In these drawings:—

Figure 1 illustrates the general arrangement of the two conjugated brakes, the right hand brake 1' being shown in elevation, and the left hand brake 1 being shown in axial section in order to show the parts.

Fig. 2 is a diagrammatic plan showing the combination with the parts of a slewing crane, of the dynamometric brake for the lifting apparatus and of the reversing mechanism for slewing.

The mechanism for effecting the travel of the crane is not shown; it is similar to that which produces the slewing motion.

As shown in Fig. 1, in each of the brakes 1, 1', the driving pinion 2 is fixed on the shaft X X', whereas the toothed wheel 3 is loose on the said shaft which in all cases serves as a support for the brakes 1 and 1' through the medium of the ball bearings shown at 4, 4 for the brake 1.

Each brake 1, 1' loose on the driving shaft, can be rendered stationary at will by means of a brake band as shown in Fig. 2.

The driving couple of the pinion 2 is transmitted to the loose wheel 3 through the medium of the pair of wheels 5 and 6 rotating around the axle Y Y which forms as it were one piece with the brake 1. A second pair of toothed wheels 7 and 8 fixed on an axle that is diametrically opposite the axle Y Y allows of dividing into two the power transmitted by the driving pinion 2 at the same time as it counterbalances the first pair in such a manner that the center of gravity of the system shall be exactly situated in the axis of the driving shaft X, X'.

The driving wheel 3, loose on the driving shaft, is supported in ball bearings 9 and 10. It is fixed to the wheel 11 which transmits the driving couple of the pinion 2 to the outside of the brake 1.

When the brake 1 is rendered stationary by the band brake, the whole constitutes a speed-reducing gear; when on the contrary it is free, the wheel 11 will remain stationary and the brake 1 will revolve idly around the shaft X', X. No claim is made to the dynamometric brake *per se* as described above.

The combination of the two dynamometric brakes 1, 1', arranged side by side, designated by the name of conjugated double dynamometric brake, constitutes a mechanism which can be applied either for the purpose of slewing or for the purpose of traveling in all hoisting apparatus requiring a reversing motion. Fig. 2, as already stated, relates only to the reversing of the motion corresponding to the slewing, but it is obvious that the description hereinafter given is applicable exactly to the reversing motion corresponding to the traveling.

As shown in that figure it has been found that the platform rotating around the center 12 was of too small dimensions to enable the actuating devices of the mechanisms to be mounted on a single driving axle.

Consequently, the arrangement of the parts is as follows:—

13 is a motor of any kind, of an electric, steam or internal combustion type. This motor drives directly a shaft T T' that serves to carry the dynamometric brake 1ª for the lifting apparatus whose drum is marked 14, and the arresting brake is marked 15. A second driving shaft X' X receives its motion from the first mentioned shaft through bevel wheels 16 and 17. The rectangles 18, 18 designate the bearings on which roll the shafts T' T and X' X.

The conjugated double brake 1, 1' drives the reversing mechanism through bevel wheels 19, 19' and 20. The wheels 11 and 11' of the brakes engage the wheels 21 and 21' that are fixed to 19 and 19' and are loose on the fixed shaft Z' Z. A control lever 22 adapted to be pushed in one or the other direction, serves to arrest the brake 1 or 1'; consequently the motion of the shaft X' X is transmitted to 11 or 11', thereby producing rotation of the horizontal bevel wheel 20 in one direction or in the opposite direction. On the vertical shaft of the wheel 20 there is likewise fixed a pinion 23 meshing with the ring of teeth 24 fixed to the stationary lower platform of the crane.

The movable upper platform of the crane which is driven by the rotation of 23, rotates around the center 12 of the toothed wheel 24.

In addition to the advantages inherent to the brake described in the case of the dynamometric windlass, the double dyamometric brake affords the possibility of passing without transition from one direction of rotation or travel to the opposite direction, without shock. Owing to the limitation of the driving couple by the band brake acting upon the periphery of the brake 1, the sudden change of the direction of rotation produces at first a sliding of the brake 1, the frictional work of which absorbs gradually the momentum of the moving masses. The arrest of the mass is effected without a break and the reverse motion recommences without any loss of time.

What I claim is:—

1. A reversing mechanism comprising the combination of a motor driven by electricity or otherwise with a shaft driven by said motor, two dynamometric brakes mounted upon said shaft, each having a single circular box loosely mounted on the driving shaft in which are placed two satellite systems each consisting of a wheel and pinion rigidly fixed together and mounted on the same spindle, said wheel engaging with a pinion fixed on the driving shaft and said pinion engaging with a wheel fixed on a sleeve concentric to and loosely mounted upon the driving shaft, two brake bands adapted to engage one on each of the said circular boxes, a lever for operating said brake band so arranged that when one band is applied the other is released, two bevel pinions each being adapted to be driven through suitable gearing by one dyamometric brake, and a crown bevel wheel gearing with the said bevel pinions and mounted upon the shaft to which it is required to apply the reversing motion.

2. A reversing mechanism for operating the slewing and traveling motion of cranes comprising the combination of a motor driven by electricity or otherwise mounted upon the rotary platform of a crane, with a shaft driven by said motor, two dynamometric brakes mounted upon said shaft each having a single circular box loosely mounted on the driving shaft in which are placed two satellite systems each consisting of a wheel and pinion rigidly fixed together and mounted on the same spindle, said wheel engaging with a pinion fixed on the driving shaft and said pinion engaging with a wheel fixed on a sleeve concentric to and loosely mounted upon the driving shaft, two brakes bands adapted to engage one on each of the said circular boxes, a lever for operating said brake bands so arranged that when one band is applied the other is released, two bevel pinions each adapted to be driven through suitable gearing by one of the dynamometric brakes, a crown bevel wheel engaging with the said bevel pinions and mounted upon a shaft projecting through the rotary platform and a pinion mounted upon said shaft adapted to engage with a toothed ring mounted upon the frame of the crane.

In testimony whereof I have signed my name to this specification.

HUBERT FRANCOIS HENRI GEORGES MIOT.